United States Patent Office 3,647,699
Patented Mar. 7, 1972

3,647,699
SURFACE CONDITIONER COMPOSITION
FOR ABS RESIN
Warren R. Doty, Royal Oak, and Bobbie D. Knight, Tecumseh, Mich., assignors to General Motors Corporation, Detroit, Mich.
No Drawing. Original application Dec. 22, 1967, Ser. No. 692,702, now Patent No. 3,598,630. Divided and this application July 6, 1970, Ser. No. 60,981
Int. Cl. B44d 1/22; C09d 3/36; C08d 13/24
U.S. Cl. 252—79.2
2 Claims

ABSTRACT OF THE DISCLOSURE

A treatment for ABS polymers to improve the adhesion of coatings thereto. Improved wettability of the surface results from the oxidation of a portion of the available double bonds on the surface of the polymer. The polymer is treated in a solution containing from 50 to 80 percent by volume of U.S.P. grade orthophosphoric acid (05.3% $H_3PO_4$) and from 5 grams per liter to saturation of potassium permanganate.

This application is a division of application Ser. No. 692,702, now U.S. Pat. No. 3,598,630, entitled "Method of Conditioning the Surface of Acrylonitrile-Butadiene-Styrene," filed Dec. 22, 1967, in the name of Warren R. Doty and Bobbie D. Knight, and assigned to the assignee of this application.

This invention relates generally to the treatment of plastics to render them more susceptible to the receipt and retention of coatings applied thereto. This invention is more particularly directed to the decorative plating of acrylonitrile butadiene styrene.

With the recent advances in the molding of such commercially attractive polymers as acrylonitrile butadiene styrene (ABS) has come a considerable effort by the industry to improve the coatability thereof. A variety of techniques, including mechanical, electrical and chemical, have been developed which improve the adhesion of coatings applied to the surfaces of those polymers. Among the techniques which have become commercially significant in conjunction with the treatment of ABS polymers are the sulfuric acid family of etchants. These can generally be classified into three principal categories. The first category is the high concentration sulfuric acid treatment wherein solutions containing about 70% by volume of sulfuric acid and about 20–25 grams per liter of $CrO_3$ are applied to the surface. The next category is the intermediate concentration sulfuric acid treatment wherein solutions containing about 45% by volume of sulfuric acid, 22% by volume of phosphoric acid and about 30 g./l. of $CrO_3$ are applied to the plastic surface. The last category is the low concentration sulfuric acid treatment wherein solutions containing about 20% by volume of sulfuric acid and about 585 g./l. of $CrO_3$ are applied to the plastic surface. All of these solutions generally require operating temperatures of about 50–70° C., and are highly corrosive. Attempts have been made to substitute other oxidizing agents such as $KMnO_4$ in place of the $CrO_3$ in the sulfuric acid family of solutions. These attempts have met with virtually no commercial success owing to the instability of the $KMnO_4$ in $H_2SO_4$. The high decomposition rate of the permanganate in the sulfuric acid solution resulted in solutions having extremely short useful lives. Sulfuric acid solutions of potassium permanganate, for the most part, have practical service lives of less than 1 day. Attempts to revitalize the solutions by adding $KMnO_4$ thereto were frustrated when manganese dioxide formed. The manganese dioxide appeared to catalyze the autodecomposition of the permanganate and accelerate the overall breakdown rate of the bath.

It is, therefore, an object of this invention to provide an improved stabilized acidified $KMnO_4$ solution for the treatment of ABS surfaces. It is a further object of this invention to provide a surface treatment for ABS which can be carried out at room temperature. These and other objects and benefits of this invention will become more clear from the detailed discussion which follows.

We have discovered an improved surface conditioner for ABS plastics which comprises a solution of potassium permanganate in phosphoric acid. Our solution not only insures that the surfaces treated will be completely and adhesively covered by the coatings applied thereto, but the solutions themselves are usefully sustainable for commercially practical periods. Our solution is particularly useful to the industry owing to its capability of operating at about room temperature.

The degree and character of surface conversion varies with the strength of the solution, treatment time and solution temperature. A proper combination of these variables will permit many $KMnO_4$—$H_3PO_4$ concentration combinations to be operative. Solutions containing from about 50% to 80% by volume of U.S.P. grade orthophosphoric acid, 5 g./l. to saturation of potassium permanganate, and the balance water, are effective for treatment times of less than about 30 minutes and operating temperatures of about 25° C. U.S.P. grade orthophosphoric acid contains 85–88% by weight $H_3PO_4$ (usually about 85.3%) and the remainder $H_2O$. For purposes of this application, the expression U.S.P. orthophosphoric acid refers to the 85.3% by weight solution. Higher temperatures may, of course, be used effectively, through it is not normally necessary to do so. Higher temperatures tend to shorten the conditioning life of $H_3PO_4$—$KMnO_4$ solutions. Longer treatment times may in some cases be effective. On the other hand, the possibility of a deleterious acid attack of the plastic increases with exposure time. The aforesaid range of solution concentrations permit room temperature operations at treatment times which vary from about 2–30 minutes. Particularly effective solutions comprise about 5–20 g./l. $KMnO_4$ and 60–70% by volume of U.S.P. $H_3PO_4$ and can be used for treatment times of about 16 minutes or less. A preferred solution comprises about 60% by colume U.S.P. phosphoric acid and 10 g./l. of potassium permanganate.

Cycolac test panels (3" x 3½") sold by Marbon Chemical Division of Borg Warner Corporation were used in a series of tests involving this invention. Cycolac is the name applied by Marbon Chemical Division to its plating grade ABS plastic and is further identified as Marbon's ABS number EP-3510. The panels were first wiped clean with alcohol. These panels were conditioned in various $KMnO_4$—$H_3PO_4$ solutions at room temperature for periods which varied from 2–16 minutes. After conditioning, the panels were sensitized for 2 minutes, at room temperature, in a solution containing 50 grams of $SnCl_2$, 140 cc. of HCl, and 860 cc. of $H_2O$. Subsequently, the panels were activated for 2 minutes, at room temperature, in a solution containing 264 milligrams of $PdCl_2$, 5 cc. of HCl and 105 cc. of $H_2O$. An electroless copper coating was deposited on the panels for 5 minutes at room temperature. A properietary bath known as Cuposit, which is sold by Shipley Co., Inc., of Newton, Massachusetts, was used for this electroless copper coating. After the electroless copper coating, a copper strike was applied from a standard acid copper bath containing 225 g./l. of $CuSO_4$ and 28.8 cc. per liter of $H_2SO_4$. An additional copper coating from another acid copper bath was deposited for 40 minutes in a half-box to a 2 mils thickness on the flat side of the test panel. The panels were then aged for two days and then adhesion tested by peeling one inch (1") wide test strips from the panels using the adhesion test proceduce outlined in Marbon Chemical Division's Technical Report No. P–103 regarding Quality Assurance Program-Plastics, Cycolac EP–3510. The procedure calls for cutting a 1" wide strip on the plated test panel, forming a tab thereon and peeling the strip from the plastic using a tensometer while continuously recording the amount of pull required to peel the plate. The adhesion of the plate to the ABS was measured in pounds per inch. For purposes of this application, adhesion data is reported as the mean between the readings on the test machine. The following are intended to serve as specific examples of our invention.

EXAMPLE 1

A fresh solution containing 5 g./l. $KMnO_4$, 70% by volume of U.S.P. grade orthophosphoric acid and the balance water was used to condition several panels for 16 minutes at 25° C. After plating and testing as outlined above, the panels were completely covered and displayed mean adhesion values of about 7.0 lbs./in.

EXAMPLE 2

A fresh solution containing 5 g./l. $KMnO_4$, 80% by volume of U.S.P. orthophosphoric acid and the balance water was used to condition several panels for 8 minutes at 25° C. After plating and testing as outlined above, the panels were completely covered and displayed mean adhesion values of about 5.0 lbs./in.

EXAMPLE 3

A fresh solution saturated (21.4 g./l.) with $KMnO_4$, 70% by volume of U.S.P, orthophosphoric acid and the balance water was used to condition several panels for 16 minutes at 25° C. After plating and testing as outlined above, the panels were completely covered and displayed mean adhesion values of about 7.8 lbs./in.

EXAMPLE 4

Several fresh solutions containing 10 g./l. $KMnO_4$, 60% by volume of U.S.P. orthophosphoric acid and the balance water were used to condition several panels for from 4–16 minutes at 25° C. After plating and testing as outlined above, the panels were completely covered and displayed mean adhesion values of about 9.5 lbs./in.

EXAMPLE 5

Several fresh solutions containing 20 g./l. $KMnO_4$, 60% by volume of U.S.P. orthophosphoric acid and the balance water was used to condition several panels for from 2–16 minutes at 25° C. After plating and testing as outlined above, the panels were completely covered and displayed mean adhesion values of about 7.2 lbs./in.

EXAMPLE 6

A fresh solution saturated (15.2 g./l.) with $KMnO_4$, 80% by volume of U.S.P. orthophosphoric acid and the balance water was used to condition several panels for 8 minutes at 25° C. After plating and testing as outlined above, the panels were completely covered and displayed mean adhesion values of about 6.2 lbs./in.

During those tests, it was noted that panels treated with solutions having potassium permanganate concentrations of less than about 5 g./l. in 80% by volume U.S.P. orthophosphoric acid were adequately covered with deposited metal. However, solutions in this range had either a useful life of less than about two days, or the plate had a low adhesion value. In this particular series of tests, orthophosphoric acid concentrations of at least about 60% by volume consistently produced good results. During this series of tests, it was observed generally that if the permanganate concentration was held constant, the mean adhesion values lessened as the $H_3PO_4$ concentration of the solution was increased above about 60% by volume. It was likewise observed that below $H_3PO_4$ concentrations of about 70% by volume, the mean adhesion values lessened as the $KMnO_4$ was increased above about 10 g./l. but that at concentrations above about 70% by volume, this trend reversed itself.

Another series of tests were conducted wherein Cycolac EP–3510 test panels were treated for 30 minutes in a variety of $KMnO_4$—$H_3PO_4$ solutions. These panels were sensitized for 1 minute at room temperature in a solution containing 50 g./l. of $SnCl_2.2H_2O$, and 140 milliliters per liter of HCl. After sensitizing the panels were activated for 2 minutes in a room temperature solution containing 158 mg./liter of palladium chloride and 5 ml./liter of HCl and then copper plated at room temperature for 40 minutes at 4 amps in a half-box to a deposit thickness of 2 mils. The following are some specific examples of the results of this procedure.

EXAMPLE 7

A fresh solution containing 10 g./l. $KMnO_4$, 50% by volume of U.S.P. orthophosphoric acid and the balance water was used to condition several panels for 30 minutes at 25° C. After plating and testing as outlined above, the panels were completely covered and displayed mean adhesion values of about 9.9 lbs./in.

EXAMPLE 8

A fresh solution containing 2 g./l. $KMnO_4$, 80% by volume of U.S.P. orthophosphoric acid and the balance water was used to condition several panels for 30 minutes at 27° C. After plating and testing as outlined above, the panels were completely covered and displayed mean adhesion values of about 6.4 lbs./in.

EXAMPLE 9

A fresh solution containing 5 g./l. $KMnO_4$, 75% by volume of U.S.P. orthophosphoric acid and the balance water was used to condition several panels for 30 minutes at 25° C. After plating and testing as outlined above, the panels were completely covered and displayed mean adhesion values of about 9.8 lbs./in.

This latter series of tests also indicated that treatment with many combinations of $KMnO_4$ and $H_3PO_4$ will produce plateable panels. However, to accomplish this, more practical treatment times, solution temperatures, solution stability and adhesion values must frequently be sacrificed.

The amount of time required to properly treat the ABS is a function of several variables including the freshness of the solution, the respective concentration of the solution's ingredients, and the temperature of the solution. Generally when using solutions in the preferred range of about 60–75% U.S.P. $H_3PO_4$ and 5–20 g./l. $KMnO_4$, we prefer to treat the surface for about 8–16 minutes at room temperature.

In order to get the maximum useful life out of any particular bath, it is necessary to periodically add potassium permanganate thereto. Generally, the lower $H_3PO_4$ concentration baths outlive the higher concentration baths. The $KMnO_4$—$H_3PO_4$ system is adaptable to the periodic addition of further $KMnO_4$ without deleteriously affecting the solution's ability to function satisfactorily with respect to coverage, adhesion and life. In one particular case, a bath containing 10 g./l. of potassium permanganate and 60% by volume U.S.P. phosphoric acid had a sustained useful life of 5 days with a periodic potassium permanganate addition of only 42% of the original amount. This bath consistently produced plated samples having adhesions of from 6 to 8 lbs./inch. In another test the periodic addition of $KMnO_4$ to a $KMnO_4$—$H_3PO_4$ solution sustained the operating life thereof for over 60 days. A comparison between the relative stability of the $KMnO_4$—$H_3PO_4$ and $KMnO_4$—$H_2SO_4$ systems when no additions are made is shown in the following table. The table reflects the amount of $KMnO_4$ remaining in solution after each day. The first day is considered to be the day the solutions were made up.

|  | G./l. KMnO₄ remaining in acid | | | | |
| --- | --- | --- | --- | --- | --- |
|  | 50% H₃PO₄ | 80% H₃PO₄ | 50% H₂SO₄ | 60% H₂SO₄ | 70% H₂SO₄ |
| Days: | | | | | |
| 1 | 10 | 5 | 5 | 5 | 5 |
| 2 | 9.46 | 3.2 | 1.99 | 2.05 | 2.10 |
| 3 | 8.96 | 2.6 | 1.99 | 1.99 | 2.10 |
| 4 | 8.42 | 2.0 | 1.99 | 2.02 | 1.98 |
| 8 | 6.45 | | | | |

It should be noted that when adding KMnO₄ to the solution, it should first be dissolved in H₂O to insure the maximum solubility of the KMnO₄. Likewise normal care should be taken with respect to admixing of aqueous and acid solutions.

We have disclosed our invention primarily in terms of volumetric concentrations of U.S.P. orthophosphoric acid and weight concentrations of KMnO₄. The handiest form of orthophosphoric acid is the U.S.P. grade 85.3% solution thereof. Likewise, the most readily available and handiest form of the permanganate is in the crystalline form. We appreciate that the solutions can actually be formulated using other materials which effect the same result. Thus since the permanganate ion is the principal oxidant it may be derived from other alkali metal salts thereof such as sodium permanganate. Likewise phosphoric anhydride, metaphosphoric acid and pyrophosphoric acid may be used to actually prepare the solution. These latter acids all form orthophosphoric acid in aqueous solutions. Therefore it is clear that it is the absolute concentration of the orthophosphoric acid and the permangate ion that is significant rather than the particular means by which they are introduced into the solution. In this regard, the following information is presented. Solutions containing 50%, 60%, 70%, 75% and 80% by volume U.S.P. phosphoric acid (85.3% H₃PO₄) contain approximately 54%, 61%, 68%, 72%, and 75% H₃PO₄ by weight respectively. Likewise, the absolute permanganate ion concentration will vary depending on the phosphoric acid concentration. In this regard then a 5 g./l. concentration of potassium permanganate in an 80% by volume U.S.P. phosphoric acid solution yields about 0.23% by weight permanganate ion. A 5 g./l. concentration of KMnO₄ in a 75% by volume solution of U.S.P. H₃PO₄ yields about 0.24% by weight permanganate ion, and 20 g./l. of KMnO₄ in a 60% by volume U.S.P. H₃PO₄ solution yields about 1.04% by weight permanganate ion concentration.

Though we have disclosed our invention in terms of specific examples and preferred embodiments thereof, we do not intend to limit ourselves thereto except as defined by the claims which follow.

We claim:

1. A solution for conditioning the surfaces of acrylonitrile-butadiene-styrene so as to render them less hydrophobic and more hydrophilic consisting essentially of about 54% to 75% by weight orthophosphoric acid, an alkali metal permanganate sufficient to produce a permanganate ion concentration of at least about 0.23% by weight and the balance water.

2. A solution as defined in claim 1 wherein the concentration of said orthophosphoric acid is about 61% to about 72% by weight, said permanganate ion concentration is about 0.24% to about 1.04% and the balance water.

References Cited
UNITED STATES PATENTS 3,317,330    5/1967    Livingston et al. \_\_\_\_ 156—2 UX
3,484,270    12/1969    Saubestre et al. _____ 117—47

WILLIAM A. POWELL, Primary Examiner

U.S. Cl. X.R.

117—47; 156—2

PO-1050
(5/69)

UNITED STATES PATENT OFFICE
CERTIFICATE OF CORRECTION

Patent No. 3,647,699     Dated March 7, 1972

Inventor(s) Warren R. Doty and Bobbie D. Knight

It is certified that error appears in the above-identified patent and that said Letters Patent are hereby corrected as shown below:

Column 1, line 20, "(05.3%" should read -- (85.3% --. Column 2, line 45, "60-70%" should read -- 60 - 75% --; line 47, "colume" should read -- volume --; line 63, "105 cc." should read -- 195 cc. --. Column 5, line 6, "50%", third instance, should read -- 60% --.

Signed and sealed this 1st day of August 1972.

(SEAL)
Attest:

EDWARD M. FLETCHER, JR.
Attesting Officer

ROBERT GOTTSCHALK
Commissioner of Patents